| United States Patent [19] | [11] | 4,347,601 |
|---|---|---|
| Schmidt | [45] | Aug. 31, 1982 |

[54] METHOD AND SYSTEM FOR PROCESSING CODED INFORMATION TRANSMITTED DURING CYCLICALLY SUCCESSIVE TIME FRAMES

[75] Inventor: Hans Schmidt, Neustadt a.d. Aisch, Fed. Rep. of Germany

[73] Assignee: TE KA DE Felten & Guilleaume Fernmeldeanlagen GmbH, Nuremberg, Fed. Rep. of Germany

[21] Appl. No.: 80,071

[22] Filed: Sep. 28, 1979

[30] Foreign Application Priority Data

Oct. 4, 1978 [DE] Fed. Rep. of Germany ....... 2843179

[51] Int. Cl.³ ...................... H04Q 11/04; G06F 13/00
[52] U.S. Cl. ....................................... 370/58; 364/200
[58] Field of Search ....................... 370/58, 59, 60, 62, 370/63, 64, 66, 110; 179/18 ES; 364/200 MS File

[56] References Cited

U.S. PATENT DOCUMENTS

| 3,221,103 | 11/1965 | Adelaar et al. | 370/58 |
|---|---|---|---|
| 3,969,587 | 7/1976 | Calcagno | 370/58 |
| 4,032,721 | 6/1977 | Anizan | 179/18 ES |
| 4,091,446 | 5/1978 | Demonte et al. | 364/200 |
| 4,112,258 | 9/1978 | Alles | 370/110 |
| 4,151,375 | 4/1979 | Bambara et al. | 179/18 ES |

*Primary Examiner*—Douglas W. Olms
*Attorney, Agent, or Firm*—Michael J. Striker

[57] ABSTRACT

Thirty telephone channels are time-division-multiplexed for transmission and reception in a PCM 30 transmission system. The control- and switching-signals of the thirty telephone channels (e.g., dialing pulses, busy signals, dial tone signals, etc.) are converted from the form of ordinary D.C. currents to an encoded form which the time-division-multiplex system can process. The processing of all the control- and switching-signal data is performed during computing time intervals of a time frame which has been subdivided into computing time intervals in real-time using a control logic which cooperates with a data storage, the control logic being comprised of programmable and permanently wired functional circuit stages. The selection of a particular program from those programmed in such functional circuit stages is performed in dependence upon the significance of the control- and switching-signal information being processed.

7 Claims, 4 Drawing Figures

METHOD AND SYSTEM FOR PROCESSING CODED INFORMATION TRANSMITTED DURING CYCLICALLY SUCCESSIVE TIME FRAMES

BACKGROUND OF THE INVENTION

The present invention relates to control- and switching-signal converters used for processing coded information transmitted during cyclically repeated time frames.

The invention is most especially concerned with the processing of the control- and switching-signals needed by telephone exchanges for the connection and disconnection of telephone channels. Most especially, the invention concerns control- and switching-signal converters used in analog or digital telephone-exchange systems, especially those associated with transmission systems of the type PCM 30, and connected between the selector systems of such telephone-exchange systems.

The use of control- and switching-signal converters in a PCM time-division-multiplex transmission system is described in the German publication "Siemens-Zeitschrift 49 (1975)," Volume 7, pages 466–472. The conventional control- and switching signals involved (usually in the form of D.C. currents used to constitute dialing pulses, busy signals, dial-tone signals, etc.) are picked off the wires connected to a telephone set by means of electronic signal sensors, and are applied to telephone-set wires by means of electronic signal generators. The control- and switching-signal converters include control- and switching-signal evaluating circuitry which converts the control- and switching signals from conventional form (usually D.C. currents) into a coded form which can be centrally processed with a view towards PCM time-division-multiplexed transmission and reception. The control- and switching-signal converters may additionally subject the encoded control- and switching-signal data to logic-circuit processes (i.e., involving Boolean functions) on an individual-channel basis when individual-channel processing of the encoded control- and switching-signal data is, for various reasons, more convenient or more advantageous than central processing of such data.

The control- and switching-signal converter comprises a set of thirty individual-channel converters, provided in the form of thirty individual circuit modules, each insertable into and removable from a mounting frame. The mounting frame also accommodates the converter's central part. The thirty individual-channel converters each convert the control- and switching signals associated with a respective one of thirty telephone channels into digitally encoded form and present them in such form to the central part of the converter, whose commutator system interrogates the thrity channels in a cyclical sequence. In dependence upon the sequence in which the encoded control- and switching-signals pertaining to one telephone channel arrive, the converter ascertains whether an incoming or an outgoing call is involved, both the incoming-call signal-processing circuitry and the outgoing-call signal-processing circuitry associated with the respective telephone channel in the multi-channel converter being kept activated for the duration of the respective channel time interval. The central part of the converter (which in contrast to the individual-channel converters of the converter processes control- and switching-signals pertaining to all the channels involved) stores the encoded control- and switching-signals pertaining to each telephone channel until that channel's time interval is again reached. The central part of the converter assembles the control- and switching-signal data from the incoming-call signal-processing circuitry in logical combination with the stored control- and switching-signal data from all thirty telephone channels along with a frame identifying word for the entire time frame for control- and switching-signal data of all thirty channels and also a calling word, for the transmitted signal. After all this digitally encoded information, needed for telephone-exchange operation, has been assembled it is applied as a time-division-multiplex signal to the multiplex unit of the transmitter employed. In the receiving-direction multiplex unit the control- and switching-signal data is so ordered by a channel distributor or commutator that from one time frame to the next the presently active channel of the transmitter, the presently active channel of the receiver and the presently active channels internal to the system all coincide, for proper time-division-multiplex operation.

Of disadvantage with this known method and the circuitry used to implement it is the division of the converter's control- and switching-signal converter modules into incoming-call and outgoing-call circuit modules and the high number of discrete insertable/removable converter modules which are needed as a result, leading to a circuit arrangement which is very complex from the spatial viewpoint. Also disadvantageous is the need to rewire the wiring structure of the wired control logic employed when changes of the peripheral equipment involved arise.

SUMMARY OF THE INVENTION

It is a general object of the invention to provide a method of the type in question which is much more economical with regard to implementation, which can be very readily adapted to various types of information sources with minimal cost and with no need to modify the structure of the information sources involved.

In accordance with the inventive method, the time frame employed is subdivided into computing-time channels and all information is processed in real-time during one computing-time channel with the aid of a control logic comprised of programmable and permanently wired functional circuit stages designed to cooperate with a data storage, with the selection of a particular program from a plurality of programs stored in respective programmed functional circuit stages being determined by the functional significance of the information involved.

The inventive method has the advantage that it makes available variable signal-processing procedures almost to the extent where the signal-processing procedures which can be implemented can be designed to meet whatever needs a particular customer may specify. Furthermore, the cost for logic-circuit elements which perform cyclically repeated signal-processing steps of the signal-processing procedures involved can be minimized without any sacrifice as to the flexibility and the complexity of the signal-processing procedures which can be implemented.

According to an advantageous concept of the invention, the information to be processed is written into a storage of the processor via an input bus lines. The processor is organized into peripheral components and a central part, the latter being comprised of an instruction storage, a data storage, a computing unit, a program-word register, an input multiplex unit, and a hardware-control unit. The writing of a program word from the data storage into the program-word register is controlled by the content of the encoded control- and switching-signal information involved and by the command storage. The program word in turn selects one of the available programs. A plurality of variables, having a definite order, are computed in accordance with Boolean algebra as a function of the information (i.e., the encoded control- and switching-signal information) written into the data storage. The program word for the next signal-processing operation, which is to begin at a predetermined point in time within the permanently predetermined time frame employed, is stored in an intermediate storage. The processing of the written-in information is finished, when the information (i.e., the encoded control- and switching-signal information) has been converted into the form of control commands for the peripheral equipment involved with the control commands being supplied to the output bus line of the converter.

This has the advantage that all the stored control- and switching-signal information can be drawn upon for use as decision criteria, and that as a result of the free programmability of the computing unit its content can be optimally matched to the various real-time and signal-processing problems to be encountered in particular applications.

In particular, it is preferred that the processing of the instruction words of the program be performed successively and bitwise. During the step-by-step performance of the program, the storing or erasing of the information is performed by the hardware-control unit in dependence upon the computed and logically combined variables.

As a result of this organization of the information-processing procedure there is no need for further information-processing steps in the anyway limited number of information-processing steps.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
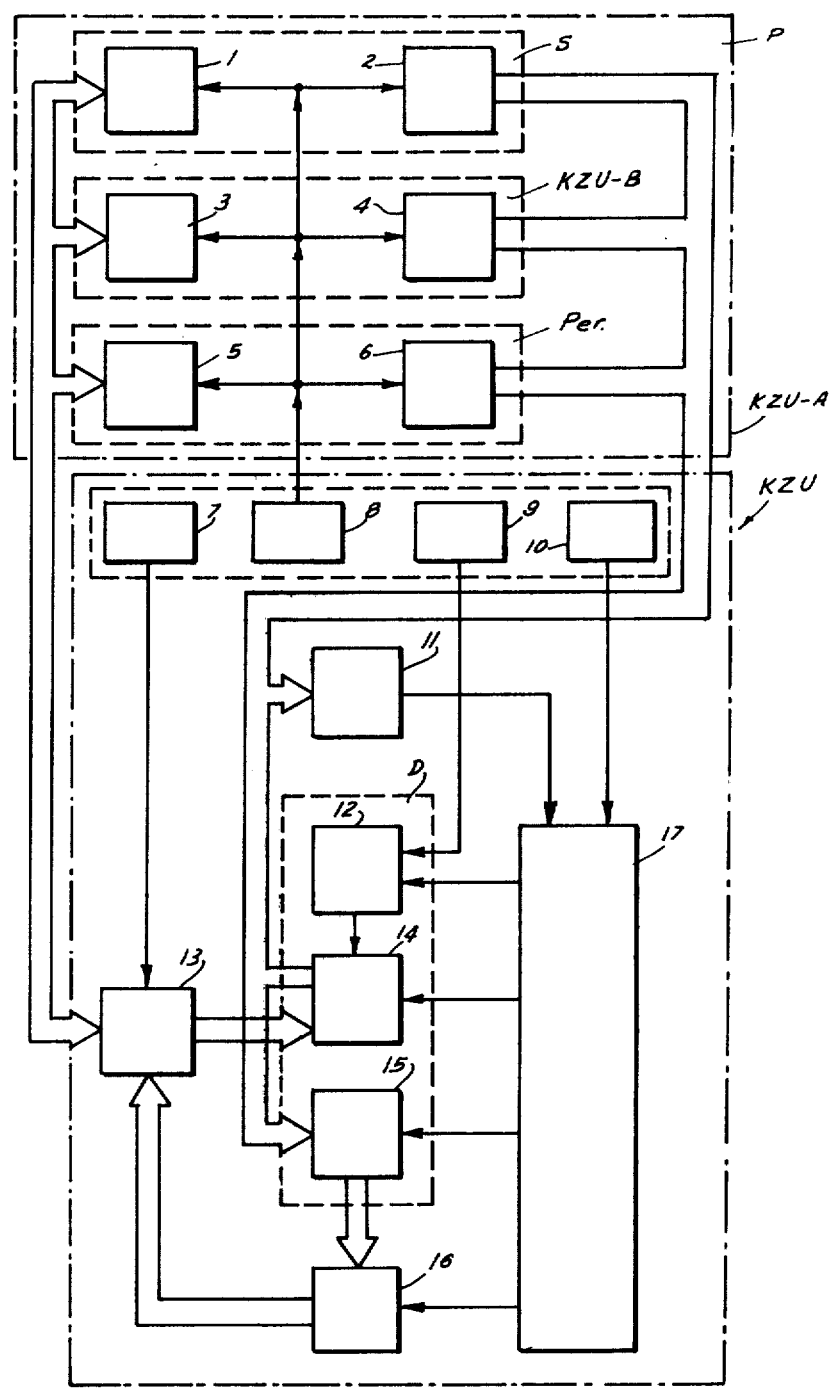
FIG. 1 is a block circuit diagram of a control- and switching-signal converter used in accordance with the present invention.

FIG. 1 depicts in block diagram form a control- and a switching-signal converter KZU which implements the processing of control- and switching-signal information needed for telephone-exchange operation when employing a time-division-multiplex transmission system of type PCM 30.

The 20-millisecond-long PCM time frame is subdivided into a number of time intervals equal to the number of telephone channels involved, i.e., thirty, and two internal system channels, two in number, for a total of thirty-two channels. The expresssion time frame will be understood to refer to the total periodic pattern into which the sampled data of the multiplex channels are assembled for formation of a multiplex signal, the period of the periodic pattern being equal to the length of time which the commutator switch of the transmitter or receiver system requires for sampling all of the channels involved. A particular sampled value is associated with a particular time interval within the time frame, such time interval being herein also referred to as a time channel. The frame synchronization pattern is accommodated in the zero-th time channel and the control- and switching-signal information is transmitted in the 16-th time channel.

The control- and switching-signal converter KZU (having components KZU-A and KZU-B discussed below), at the connections thereof to the coöperating exchange, is directly connected to the selector system thereof.

In FIG. 1, the broad lines represent the lines which transmit the sampled information, whereas the thin lines indicate the interconnections as between various circuit units.

The individual-channel control- and switching-signal converters KZU-B each received the control- and switching-signal information from a respective one of the thirty telephone channels involved via respective ones of thirty circuit stages of a receiver unit 3. Each of the thirty, individual-channel converters KZU-B (represented by a single box in FIG. 1) converts the respective individual-channel control- and switching-signals which it receives into an encoded form which can be processed by the converter's central part KZU-A. Conversely, the encoded control- and switching signal data applied by the converter's central part KZU-A to the individual-channel converters KZU-B is converted by the latter into suitable potentials which are applied to appropriate ones of the thirty circuit stages of the transmitter stage 4 of the individual-channel converters KZU-B. The converter's central part KZU-A assembles the encoded control- and switching-signal data from all thirty individual-channel converts KZU-B to form a 64-kbit/sec signal.

The low-frequency information (typically, speech signals) is converted in the multiplex device by means of channel circuits in a central encoder into 8-bit PCM signals and transmitted in time-division-multiplexed form along with the aforementioned 64 kbit/sec signal. There is produced at the output of the multiplex device a 2048-Mbit/sec signal, which includes a synchronization word and the control- and switching-signal data channel, which latter accommodates the 64 kbit/sec control- and switching-signal information. The 2048-Mbit/sec signal is then transmitted via a conductor to the receiving exchange or office. In the opposite direction, the multiplex device extracts from the incoming or arriving time-division-multiplexed signal the information pertaining to incoming calls and processes, for example, the control- and switching-signal information thereof in the central part of the converter and the control- and switching-signal information pertaining to incoming calls and the latter, converted into the conventional form of D.C. current signals, are further transmitted via the voice and control-signal wires of the individual telephone channels to the selector stage. The synchronization information synchronizes the time-division-multiplexed transmission system, at its receiving end, to the time frame of the transmitter. The synchronization word at the start of each time-multiplex frame is selected with a view to minimizing the probability that it will be confused with the various other information in the thirty telephone channels. To establish connections between individual subscriber stations, the calling station first searches for a free time slot in the time-multiplex frame and inserts its own address as well as the address of the called station into such free time slot on the transmitting line via the 64-kbit peripheral transmitting arrangement 6. The called station checks out on the receiver line via the 64-kbit peripheral receiver arrangement 5 all the time channels and sychronizes itself to a particular time channel upon receipt of its own address. By exchanging the address of both stations in the corresponding time channel on the transmitting line, the called station acknowledges that it has received. This acknowledgement is in turn received via the receiving line by the calling station. From this moment in time on, the corresponding time channel of the multiplex frame of both stations remain constantly associated with each other and the transmitting and receiving line can now exchange information.

The control- and switching-signal data channel operates with a synchronization independent of the multiplex device. Several time channels for the transmission of the control- and switching-signal information are combined together to form a corresponding multiframe, denoted as a control- and switching-signal frame. The switching-signal data for thirty speech channels is provided in sixteen time frames. In the channel counter 9 the channel switch is so activated that a particular time channel corresponds to a particular switch setting. To synchronize the control- and switching signal data frames the frame counter is arrested at frame 0 and an equivalence circuit compares the PCM sum signal with the simulated or reproduced synchronization pattern. Upon recognition, the frame counter counts, in the next step, sixteen frames and checks whether the received signal changes on the logic level. If this does occur, then the receiver and transmitter are operating synchronously.

In the part of the PCM 30 transmission system which implements operations relating to exchange operation, the central part KZU-A of the converter implements a control process and the individual-channel converters KZU-B a device-oriented configuration. In addition to the already mentioned components whose functions have been set forth above (i.e., the circuit stages in receiver arrangement 3, the circuit stages in transmitter arrangement 4, the 64-kbit peripheral receiver arrangement 5, the 64-kbit peripheral transmitter arrangement 6, of the 64-kbit peripheral equipment PER), there are also provided an alarm information input unit 1 and an alarm output unit 2 of a signalling unit S. In FIG. 1, further units whose presence will be understood are not expressly depicted, e.g., for power supply, for generation of clocking signals, and for synchronization.

The central part KZU-A of the converter includes the following components: a hardware-control unit H, comprised of a DATA-IN/DATA control unit 7, a peripheral-hardware control unit 8, the channel counter 9 and computer clock counter 10 as well as an input multiplex device 13, program-word register 11, data storage D, the latter comprised of an RAM-addressing unit 12, an RAM 14, an RAM intermediate storage 15; as well as a computing unit 16 (hereafter referred to as the CLU), and an instruction storage 17. The instruction storage contains permanently programmable functional circuit stages. Because certain programs are established before the devices are supplied and are not to be destroyed upon switch-off the device, the instruction storage 17 is made up of ROM's. The instruction storage 17 controls the write-in and read-out of the data in the data storage D and its processing in the computing unit 16. In the data storage D there are stored all the data for the thirty telephone channels, as well as the two internal system channels for synchronization and signalling, in 4-bit parallel form. In the CLU 16, the Boolean equations are solved, the counts on counters compared, increased or erased. The two data bus lines are organized in 4-bit parallel form.

The two time channels reserved for internal system operations, e.g., control- and switching-signal data frame sychronization, are permanently written into the program-word register 11 as a program. This simultaneously serves, upon switch-on of the converter device, as an initial routine which brings the converter's central part KZU-A into a starting state. Additionally, the central part monitors itself in these two computing time channels, the but line of the thirty individual-channel converters KZU-B and performs the central alarm operation for the entire PCM 30 system. For each of the other thirty time channels, a number of programs are available, for implementation of the various functions needed for telephone-exchange operation. The computer clock counter 10 and the channel counter 9 control both the converter's central part and also the peripheral-hardware control unit 8 for the peripheral equipment P. The furnishing and transfer of the data information is determined for the individual-channel converters KZU-B by the peripheral-hardware control unit 8.

During each computing time channel, of duration 62.5 microseconds, 128 computational steps are to be performed. Because of the time requirements, there is available in the converter's central part KZU-A 488 nanoseconds for each computational step in which a program operation is to be performed. The possible operations which are performed during the 128 computational steps, including computer clock signals, are conditional jumps for the selection of a particular program, RAM-write-in, RAM-read-out as well as the processing of Boolean equations and the comparing, increasing and erasing of counts on counters.

The operation of the system described above will now be discussed.

Figure 2:
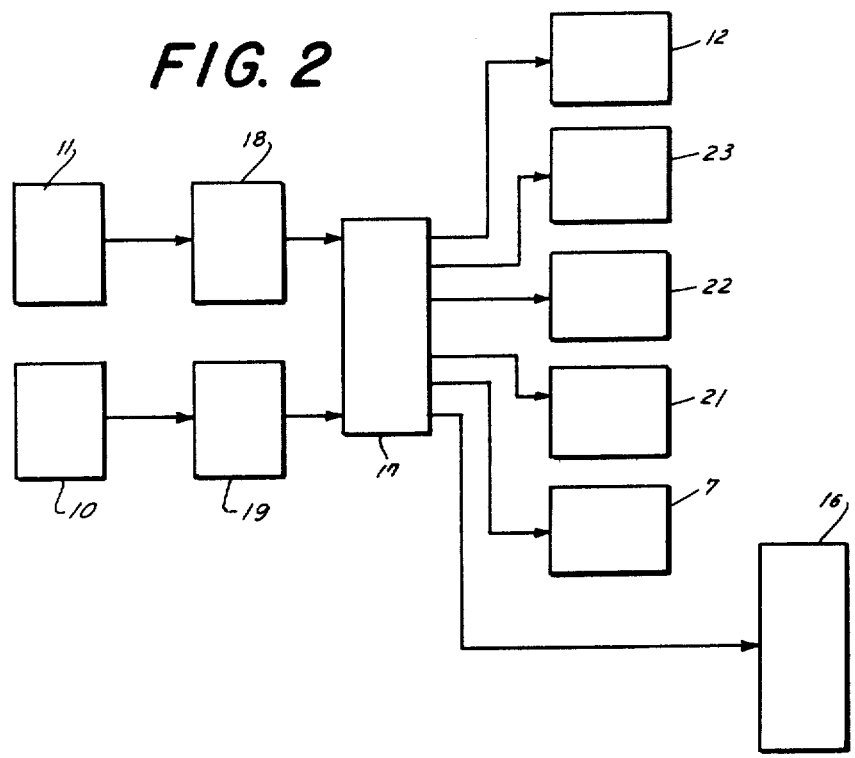
FIG. 2 depicts in block schematic form one possible internal organization for the instruction storage of FIG. 1.

The main component of the circuit arrangement shown, in block form, in FIG. 2 is the instruction storage 17. The instruction storage 17 is activated and controlled by a program-word decoder 18 and a computer-clock decoder 19. In the program-word register 11, one of the possible programs is selected, each containing 128 instruction words. For example, after a particular program word has been made operative, these instruction words are made operative by the cyclically operating computer-clock counter 10 and the computer-clock decoder 19. Within one computing time channel with its 128 computer clock signals, the contents of the program-word register 11 can be altered only at certain times within the computational cycle. The instruction word can, in correspondence to its two functions, be subdivided into one part for the control of the data storage and one part for the control of the CLU. The processing time for one computer clock interval, in this case for one instruction word, during which one program operation is performed, amounts to 488 nanoseconds (2048 MHz).

Figure 3:
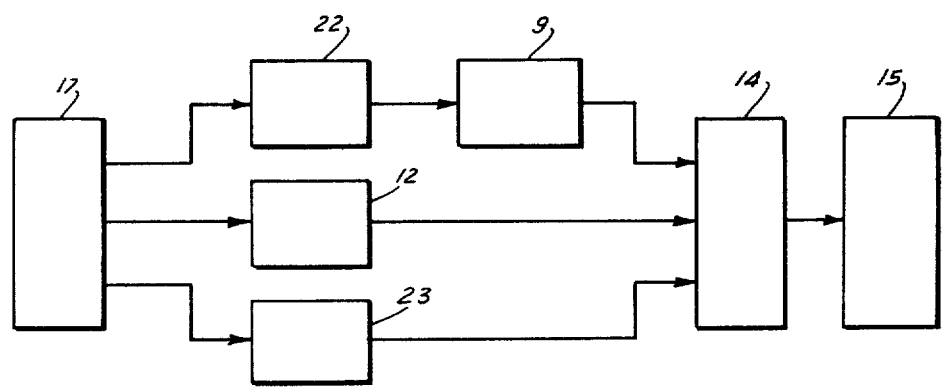
FIG. 3 depicts one possible configuration for the control of the data storage.

Further aspects of the control of addressing proceed in accordance with a circuit arrangement as shown in FIG. 3. The read-write RAM 14, whose storage locations are individually addressable and whose contents can be altered as often as desired, is subdivided into a plurality of word fields. Each of these fields can be activated by an RAM-chip-select bit 23. The RAM-chip-select bit 23 fulfills the function of a selector switch for selecting one of the word fields (RAM chips) of the RAM 14. The word fields are addressed by direct transfer of the control information from instruction storage 17 via the RAM-addressing unit 12. Each of the possible addresses, i.e., the possible programs, is addressed by a combination of the RAM-chip-select bit 23. In dependence upon the DATA-IN/DATA-OUT control unit 7, the channel counter 9 is activated for control of the data storage D. As a result, the word fields are subdivided into thirty-two storage fields in correspondence to the thirty-two channels which are to be processed in the PCM system. Each of these fields has a number of bit storage locations corresponding to the number of possible programs and the number of word fields.

Independently of the count on channel counter 9, the address selecting unit 22 can set a particular address of the RAM-chip-select bit 23. Accordingly, it is possible during each time channel to address the storage field of a particular time channel in the RAM 14. This storage field, here denoted the computing field, has two functions. It makes possible the exchange of information between two individual computing time channels. As a result, the processing of a central alarm can be performed in the PCM 30 system, for example. Also, the storage field is used as an auxiliary storage space for the individual computing time channels. It can also be used for the storage of intermediate results which will not be needed after completion of the respective computing time channel.

The random-access intermediate storage 15 comprises a number of storages of one bit each corresponding to the number of word fields. The data produced at the outputs of RAM 14 are written in in dependence upon the reading of the random-access memory. The random-access intermediate memory 15 serves to form the input variables for the computing unit 16 for the particular Boolean equation to be solved at any particular time. As a result, it is possible to process data having differing RAM addresses.

Figure 4:
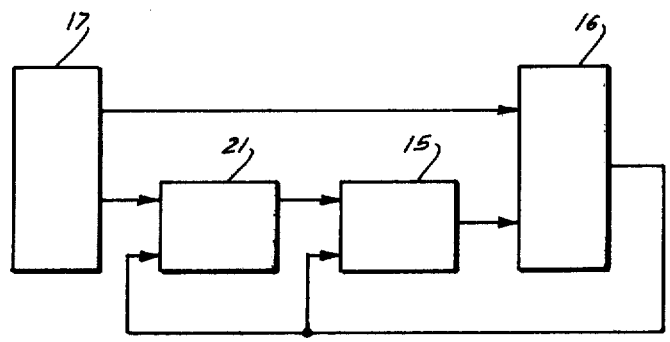
FIG. 4 depicts one possible configuration for the computing unit employed.

The storage organization and its location within the program for handling the control- and switching-signal data will be described with respect to FIG. 4. The main component of the CLU 16 is an ROM (fixed value storage) whose stored content does not change after being initially programmed, and also an erasing circuit 21. The central logic unit must perform the following functions:

1. process Boolean equations,
2. compare and increase the counts on counters,
3. erase the counts on counters.

The addresses for the computing unit 16 are formed by the CLU addresses of the instruction storage 17 and by the data bits of the random-access intermediate storage 15. The addresses of the instruction storage 17 define thirty-two fields within the ROM of the computing unit 16, in correspondence to the number of time channels. Each field, denoted as a CLU instruction, can be constituted as a truth table for the input variables.

Erasing is controlled by the erasing circuit 21 and by the input multiplexer device 13. In this respect, two states are to be distinguished:

1. storage of the erase state, and
2. performance of an erasing operation.

This differentiation is performed by means of a logical combination (i.e., involving Boolean functions) of the output variables of the intermediate storage 15 and the circuit 21.

The converter's central part KZU-A recognizes two different operations RAM-write and RAM-read, whose variants are determined by the hardware-control unit H. During a computing clock interval the central part KZU-A performs one of the two operations.

The operation RAM-read is activated by the DATA-IN/DATA-OUT control unit 7, with the following cases to be distinguished:

1. write-in of the information into the random-access intermediate storage 15,
2. write-in into the program-word register 11, and
3. write-in into the signalling stage S, KZU-B and peripheral equipment P.

Variants 2 and 3 are activated by the hardware-control unit H.

The input variables of the Boolean equations are, as already stated, formed in the random-access intermediate storage 15. The variables are determined by the address of the computing time channel to be calculated or by the DATA-IN/DATA-OUT control unit 7 of a computing time channel corresponding to a particular address of the RAM-chip-select bit 23. In order to read out the variables via the random-access intermediate storage 15 of the RAM 14, one or several RAM-read operations are necessary. An RAM-read operation is necessary when the addresses of the input variables are the same (i.e., of the possible programs, one having been selected) and a particular time channel is addressed within one of the thirty-two possible storage fields. This means that the setting of the channel counter 9 remains unchanged. Several RAM-read operations are necessary when the addresses of the input variables are different. The encoded input variables must be reordered on a bitwise basis, there being the possibility of direct access to the individual bit storage locations independently of one another. The performance of the RAM-write operation is activated by the DATA-IN/DATA-OUT control unit 7 in depedence upon the chip-select bit 23 in the RAM 14. The two variants write-in of the input information and write-in of the CLU output information are controlled by the input multiplexer device 13. As soon as all input variables have been stored in the intermediate storage 15, one RAM-write operation suffices to obtain the result at the output of the computing unit 16 and to simultaneously write such result into the RAM 14. Of course, in such connection it is necessary that, during the operation, the CLU address from the instruction storage 17 be applied to the computing unit, in order to address the particular truth table needed for the solution of the Boolean equation involved. For computations of 4-bit-parallel data which are to be transmitted to the multiplexer devices, at least two computing clock intervals are necessary, i.e., an RAM-read and an RAM-write operation.

It will be understood that each of the elements described above, or two or more together, may also find a useful application in other types of system configurations and signal-processing procedures differing from the types described above.

While the invention has been illustrated and described as embodied in the context of a PCM 30 system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of processing encoded information transmitted during cyclically successive time frames, the method including processing all information in real time during a computing time channel of a time frame subdivided into computing time channels using a control logic cooperating with a storage, the control logic being made up of programmable and permanently wired functional circuits stages, writing in the information via an input bus line into a storage of a processor, the processor being comprised of a central part and peripheral units, the central part including an instruction storage, a data storage, a computing unit, a program-word register, an input multiplexer device and a hardward-control unit; and selecting a particular program from a plurality of programs stored in the programmed functional circuit stages as a function of the significance of the information using the instruction storage to control the write-in of a particular program word from the data storage into the program-word register as a function of the significance of the information; using the program-word storage to in turn call forth one of the programs; in dependence upon the information written into the data storage computing a plurality of predefined and ordered variables in accordance with Boolean algebra; storing in an intermediate storage the program word for the next processing operation, the next processing operation being a processing operation which is to begin at a completely predetermined moment in time within the predetermined time frame; and converting the information into control commands for the peripheral units made available on an output bus line.

2. A method as defined in claim 1, performing the processing of instruction words of the program successively and bitwise, and during the step-by-step course of the program using the hardware-control unit to effect storage and erasing of information in dependence upon the computation and Boolean-function combination of the variables.

3. A method as defined in claim 1, the data storage being subdivided into a number of storage regions equal to the number of computing time channels plus the number of internal system channels, using the storage regions corresponding to the internal system channels as a central storage for internal system data and also as a computed-value storage for the storage of the intermediate computed values, and using the hardware-control unit to control changes from one address to another.

4. A method as defined in claim1, using the hardware-control unit to control the write-in of the information into the data storage and the issuance of the information via the output bus line, the write-in and the issuance of the information being cyclically repeated from one time frame to the next.

5. A method as defined in claim 1, using a nonalterable program programmed on a read-only basis into the functional circuit stages of the instruction storage to control the synchronizing of the start of processing in the control logic to the time frames of transmitted information, the self-monitoring of the processor and the monitoring of the input bus line and the output bus line.

6. A method as defined in claim 4, performing the hardware control by writing plesiochronous information of a particular time channel more often than once during one time frame into the storage region for this time channel, and processing the plesiochronous information of the particular time channel during or in the next-following time frame.

7. A method as defined in claim 1, using for the data storage the combination of a read-write storage, an addressing unit and an intermediate storage, and using for the computing unit a fixed-value storage containing no registers.

* * * * *